(12) United States Patent
Lawson (10) Patent No.: US 7,367,058 B2
(45) Date of Patent: Apr. 29, 2008

(54) ENCODING METHOD (75) Inventor: Alfred D. Lawson, Washington, DC (US)

(73) Assignee: United States Postal Service, Washington, DC (US)

( * ) Notice: Subject to any disclaimer, the term of this patent is extended or adjusted under 35 U.S.C. 154(b) by 772 days.

(21) Appl. No.: 10/158,036

(22) Filed: May 28, 2002

(65) Prior Publication Data

US 2002/0194472 A1  Dec. 19, 2002

Related U.S. Application Data (60) Provisional application No. 60/293,160, filed on May 25, 2001.

(51) Int. Cl.
G06F 7/04      (2006.01)
G06F 17/30     (2006.01)
G06K 9/00      (2006.01)
H03M 1/68      (2006.01)
H04K 1/00      (2006.01)
H04L 9/00      (2006.01)
H04L 9/32      (2006.01)

(52) U.S. Cl. ................. 726/26; 705/406; 705/407; 382/101

(58) Field of Classification Search ......... 705/406, 705/407; 382/101, 102; 726/26
See application file for complete search history.

(56) References Cited

U.S. PATENT DOCUMENTS

| | | | |
|---|---|---|---|
| 4,837,701 A | | 6/1989 | Sansone et al. |
| 5,031,223 A | * | 7/1991 | Rosenbaum et al. ........ 382/101 |
| 5,390,251 A | | 2/1995 | Pastor et al. |
| 5,454,038 A | | 9/1995 | Cordery et al. |
| 5,612,889 A | | 3/1997 | Pintsov et al. |
| 5,734,337 A | * | 3/1998 | Kupersmit ................. 340/937 |
| 5,734,568 A | * | 3/1998 | Borgendale et al. ........ 700/224 |
| 5,754,671 A | * | 5/1998 | Higgins et al. ............. 382/101 |
| 5,825,881 A | | 10/1998 | Colvin, Sr. |
| 5,925,864 A | * | 7/1999 | Sansone et al. ............. 235/375 |
| 6,073,104 A | * | 6/2000 | Field ............................ 705/1 |
| 6,539,098 B1 | * | 3/2003 | Baker et al. ................ 382/101 |
| 6,665,422 B1 | * | 12/2003 | Seidel et al. ................ 382/101 |

* cited by examiner

Primary Examiner—Benjamin E. Lanier
(74) Attorney, Agent, or Firm—Lewis and Roca LLP (57) ABSTRACT A method is described that provides efficient, secure web-based recognition services. More particularly, an embodiment of the method relates to confidential encoding by dissociating image information into individual word segments, or snippets, at a distribution point and distributing the snippets over a network to users who subscribe to provide their services. Users could include college students, housewives, or any individual with Internet access. The users view the snippets, enter equivalent ASCII information for the snippets, and send the ASCII information back over the network to the distribution point for reassembly.

6 Claims, 7 Drawing Sheets

ENCODING METHOD

CROSS-REFERENCE TO RELATED APPLICATIONS

This application claims priority from U.S. Provisional Application No. 60/293,160 filed on May 25, 2001, entitled "Encoding Method." The contents of the above application is relied upon and expressly incorporated by reference as if fully set forth herein.

STATEMENT REGARDING FEDERALLY SPONSORED RESEARCH OR DEVELOPMENT

The invention was made by an agency of the United States government or under a contract with an agency of the United States government, the United States Postal Service ("USPS" or "Postal Service"), an independent establishment of the executive branch of the U.S. government.

BACKGROUND OF THE INVENTION

1. Field of the Invention

The present invention relates to a method of providing efficient, secure web-based recognition services. More particularly, an embodiment of the method relates to confidential encoding by dissociating image information into individual word segments, or snippets, at a distribution point and distributing the snippets over a network to users who subscribe to provide their services. Users could include college students, housewives, or any individual with Internet access. The users view the snippets, enter equivalent ASCII information for the snippets, and send the ASCII information back over the network to the distribution point for reassembly.

2. Description of the Related Art

During the course of a year, the USPS processes over 200 billion pieces of mail. In order to contend with such a daunting challenge, the Postal Service has embraced different approaches to process this tremendous volume efficiently.

While the USPS's automated recognition systems, such as the Remote Computer Reader (RCR), are currently operating at unprecedented performance levels, significant volumes of mail may be impacted favorably by an embodiment of the encoding method.

In keeping with its position as a trusted third party to its customers, the USPS utilizes stringent security approaches to maintain the confidentiality of all address content within the context of addressing.

Generally, mail pieces have a ZIP Code that identifies the delivery destination, and which mailers also represent in a machine readable POSTNET code format. When represented by barcode in the POSTNET format this encodes both the full ZIP Code and supplemental delivery information such as the last digits of a street address or an apartment number. This POSTNET code thus identifies a unique mail delivery destination, e.g., someone's particular mailbox. In addition mailers may also place additional data on a mailing label that is also in barcode format. This sender code, called a PLANET code, may contain a variety of information. This optional, mailer-assigned information, may include an embedded mailer id, subscriber information, calendar information, or address information. Thus, the PLANET code gives the mailer the ability to track a mail piece when the Postal Service scans it and provides location information back to the mailer. The Postal Service makes information available by offering such services to subscribers for a fee. The combination of the destination ZIP Code data in POSTNET code format and the PLANET code also creates a unique machine readable record for a mail piece and a delivery location.

The Remote Barcoding System ("RBCS") involves a method of determining the appropriate ZIPCODE for letter mail. It basically consists of Optical Character Recognition ("OCR") systems, such as Multi-Line Optical Character Readers ("MLOCRs"), that autonomously recognize letter mail images and determine a result that is printed on the physical mailpiece in the form of a barcode, or POSTNET code. Images that do not receive an adequate result are further conveyed to remote keying sites, where operators view the destination address image scene and key either all or part of the address to obtain the appropriate ZIPCODE. Once the POSTNET code is determined it is printed, or "sprayed," on the mailpiece before it continues for further processing.

The POSTNET code is a series of bars representing ZIPCODE. The POSTNET code encapsulates the numeric ZIPCODE into a simplistic barcode that may be read by barcode reading systems, which are faster and less expensive than OCRs.

Each mailpiece also is "tagged" at the beginning of the sorting process so that it may be later identified, as described in more detail below. Briefly, a machine-readable phosphorescent identification tag is printed or sprayed on the back of each mailpiece by an Identification Code Sorter ("ICS") as it enters the MLOCR. This identification tag is unique to that particular piece of mail for 28 days, at which point the identification tag number is reused and sprayed on a different piece of mail.

Addresses that are not satisfactorily resolved by the MLOCR (because the ZIPCODE is not adequate for efficient distribution) are imaged and stored in an Image Capture Unit ("ICU"), along with their identification tag, for subsequent resolution. The ICU conveys compressed images of the addresses and the mailpiece identification tag over broadband T1 communication lines from a postal plant to other locations, such as across the town, across the state, or across the country. At these locations, called Remote Encoding Centers ("RECs"), the images are decompressed and displayed on video display terminals, and postal workers or postal contractors view the image and key in certain extraction codes of the destination address. Based on the keyed-in information, the proper ZIPCODE is determined by using extraction information to query a database containing a directory of addresses.

The identification tag and ZIPCODE is then conveyed back to the original postal plant, where the physical mailpiece is run on an Output Subsystem ("OSS"), which is a barcode sorter. Using the phosphorescent identification tag on the mailpiece, the ZIPCODE determined at the REC is matched to the mailpiece, and the corresponding POSTNET code is sprayed on the front of the physical mailpiece. The POSTNET code is read by machines throughout the sorting process to ultimately direct the mailpiece to the correct address.

The Identification Code Sorter ("ICS") is a method of associating a ZIPCODE result for mailpieces when the POSTNET code cannot be readily applied. Such an instance might occur if there are stray marks or advertising graphics on the mailpiece.

Every mailpiece that is run on an MLOCR has an identification tag that identifies it uniquely. This tag, a phosphorescent barcode sprayed on the back of the mailpiece, allows a mailpiece to be uniquely identified as it is sent from an origination postal facility, for example in Merrifield, Va., to a destination postal facility, for example, Los Angeles.

As previously described, if an MLOCR is able to recognize an address on a mailpiece, it sprays a POSTNET code on the front of the mailpiece using an inkjet printer. POSTNET codes can be read on a barcode sorter, which is a less expensive piece of equipment than an MLOCR. Thus, when the mailpiece with the POSTNET code gets to the destination postal facility (e.g., Los Angeles), it does not have to be run through expensive OCRs again in Los Angeles. Instead, the barcode sorter reads this POSTNET code.

When the MLOCR cannot resolve the address, the ICS allows a mailpiece to be sent to its destination postal facility while an unverified POSTNET code is resolved and then, based on the identification tag on the mailpiece, is matched against the mailpiece at the destination facility. A mailpiece can take 2-3 days to get to its destination facility, and the POSTNET code can be verified while the mailpiece makes its journey to its destination, instead of delaying the mailpiece while it awaits its POSTNET code.

An image of the mailpiece is taken and tagged with the mailpiece identification tag at the origination facility, and the physical mailpiece is sent on its journey to the destination facility. Once the result for this image is keyed in at the REC, as described above, for this image, the result can be dispatched to the destination facility of the physical mailpiece. When the physical mailpiece arrives at its destination facility, it is processed by a barcode sorter that reads the identification tag and queries the list of keyed-in results to determine the ZIPCODE result. Once the ZIPCODE result is provided, the mailpiece moves through the OSS barcode sorter, and the POSTNET code is applied. However, such a process requires the USPS to maintain a costly infrastructure of fixed REC facilities, overhead, a staff of keyers, equipment, etc.

It would be desirable to provide a method that obtains the advantages of the present system while minimizing the need for expensive automated equipment.

SUMMARY OF THE INVENTION

The present invention provides a solution to the above-identified problems. The encoding method provides the USPS with an efficient mechanism to maintain its status as a trusted third party and to provide confidential services to its customers, while at the same time resolving addresses in a timely manner.

An embodiment of this encoding method consists of dissociating the composite destination address by parsing the address image scene into snippets. Each snippet is distributed via a Web-based distributive system that provides only an image segment of an address, i.e., a snippet, to users that subscribe to a particular ISP or network service. Users include any individual with an Internet connection. One user group would be college students interested in earning additional money. After the snippet is displayed to the subscriber on a monitor or other display, the subscriber keys in the string of characters that the OCR was previously unable to resolve. Currently information would be keyed in on a keyboard, but as voice recognition systems and other data entry methods improve, they could be used as well. ASCII results are returned through the network, or ISP, to the origination facility, the composite address is reconstructed, and multiple Directory Lookup Units ("DLUs"), which are databases containing address information, are queried with the reconstructed, keyed-in information. The DLUs then provide the proper ZIPCODE result associated with the destination address, from which the corresponding POSTNET code can be determined.

As a result of this dissociation, the probability of an end user being able to reassemble a complete address is very small. This fact alone would maintain the confidentiality of the recipient. Further security is obtained by controlling the distribution of each image segment or snippet. The system can elect to distribute the snippets to subscribers in different cities or states. This process precludes the user from having any knowledge of the complete information. The method also makes it practically impossible for anyone to reassemble the information.

A significant cost savings is realized as a result of this encoding method being Web-based.

A further advantage of the encoding method is that recipient confidentiality is maintained.

Still a further advantage is that USPS investment in Remote Computer Barcoding System hardware is minimized.

Another advantage is that the encoding method lessens the requirement of the USPS to domicile large cadres of keyers who are not normally needed on a full time basis.

Still another advantage is that the technique may be used for all types of mail (letters, flats, parcels).

An economic advantage to the encoding method is that money is saved as a result of reducing the directory generation requirements; infrastructure and overhead costs are reduced; and repetitive motion stress injuries to full-time keyers are reduced.

This encoding method can be applied to any postal mail distribution that involves the recognition of data and has a means of identifying each place uniquely. The process also has increased value when the delivery of the final product is one day or more. The USPS currently has systems such as Identification Code Sorters ("ICS"), discussed above, that could be significantly augmented by this process.

Embodiments of the encoding method are also useful in non-postal applications and non-confidential applications. An example application involves the off-line recognition of auto tags, i.e., license plate information, as a result of traffic violations. Images of license plates imaged by a camera as a motorist illegally passes through a red light or toll booth may be conveyed using the encoding method. An image of the license plate is tagged with an identification tag and sent over a network to subscribers. The subscribers read the plate number, and potentially the state, key in the information, and send the information back over the network. The facility then uses the keyed-in information to query a database of vehicle registrations, thereby identifying the owner of the vehicle and his or her address. The facility can then send a traffic violation citation to the owner. Parsing or dissociating the string of characters representing the auto tag may or may not be necessary, depending on confidentiality restrictions.

Another application involves the extremely large volumes of mail destined to both the U.S. House of Representatives and the Senate. Mail currently is sent to a single ZIPCODE and is manually sorted to reach the appropriate Congressman or Senator. The encoding method could be used to determine the names of recipients that could not be resolved by the OCR or RCR, look up the names on a DLU to determine a corresponding ZIP+4 code (5 digit ZIPCODE plus four digit extension), where each Congressman or Senator would have a unique "plus 4" ZIP.

Yet another application involves mail destined for various embassies and consulates of the State Department. The State Department has a requirement to recognize alphanumeric data on mailpieces destined for foreign cities and countries while maintaining confidentiality of the final destination. Oftentimes the State Department does not want the whereabouts of an individual to be known, such as a State Department employee involved in a secret mission at a US. Embassy in a foreign country. Thus, all State Department mail currently is sent to a location in Virginia and distributed to various destinations overseas based on a code that is included in the address. For example, John Smith's address might be John Smith, State Department, Washington D.C., 20515, ZX254. Only the State Department knows what location the code ZX254 represents. Presently this mail is manually sorted into pouches destined for various locations, but the encoding method could be used to confidentially determine the final destination and sort the mail accordingly. After the address is imaged, dissociated, sent to users, resolved, and reassociated, the information could be sent to the State Department, who would use the result to look up the destination information corresponding to the particular code on a secure DLU and automatically sort the mail.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claim. It is to be understood that both the foregoing general description and the following detailed description are exemplary and explanatory only and are not restrictive of the invention, as claimed. Thus, the present invention comprises a combination of features, steps, and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings. The accompanying drawings, which are incorporated in and constitute a part of this specification, illustrate embodiments of the invention and, together with the description, serve to explain the principles of the invention.

BRIEF DESCRIPTION OF THE DRAWINGS

For a more detailed description of a preferred embodiment of the present invention, reference will now be made to the accompanying drawings, which form a part of the specification, and wherein.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1A:
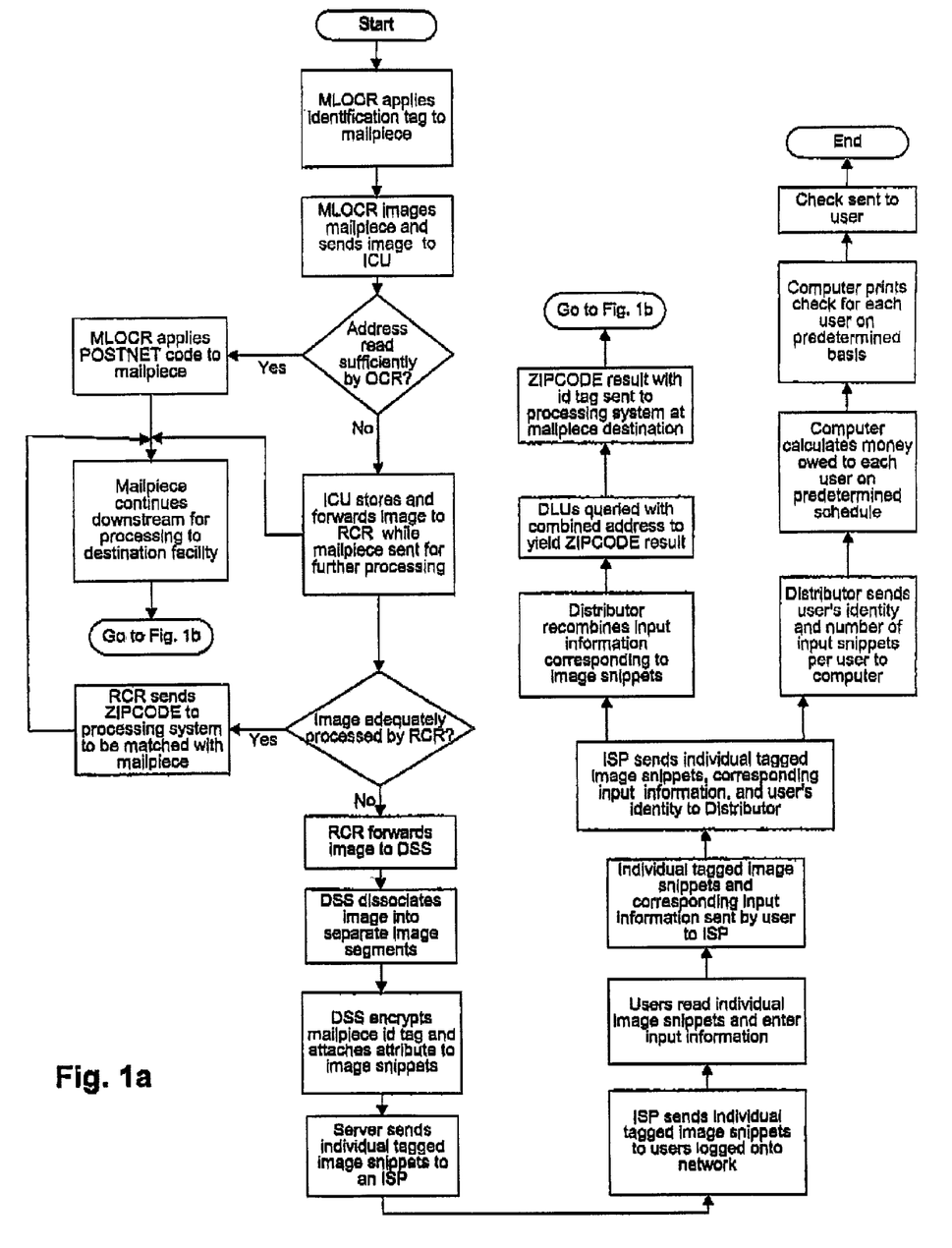
FIG. 1a is a flowchart representing one aspect of the system of the present invention.
Figure 1B:
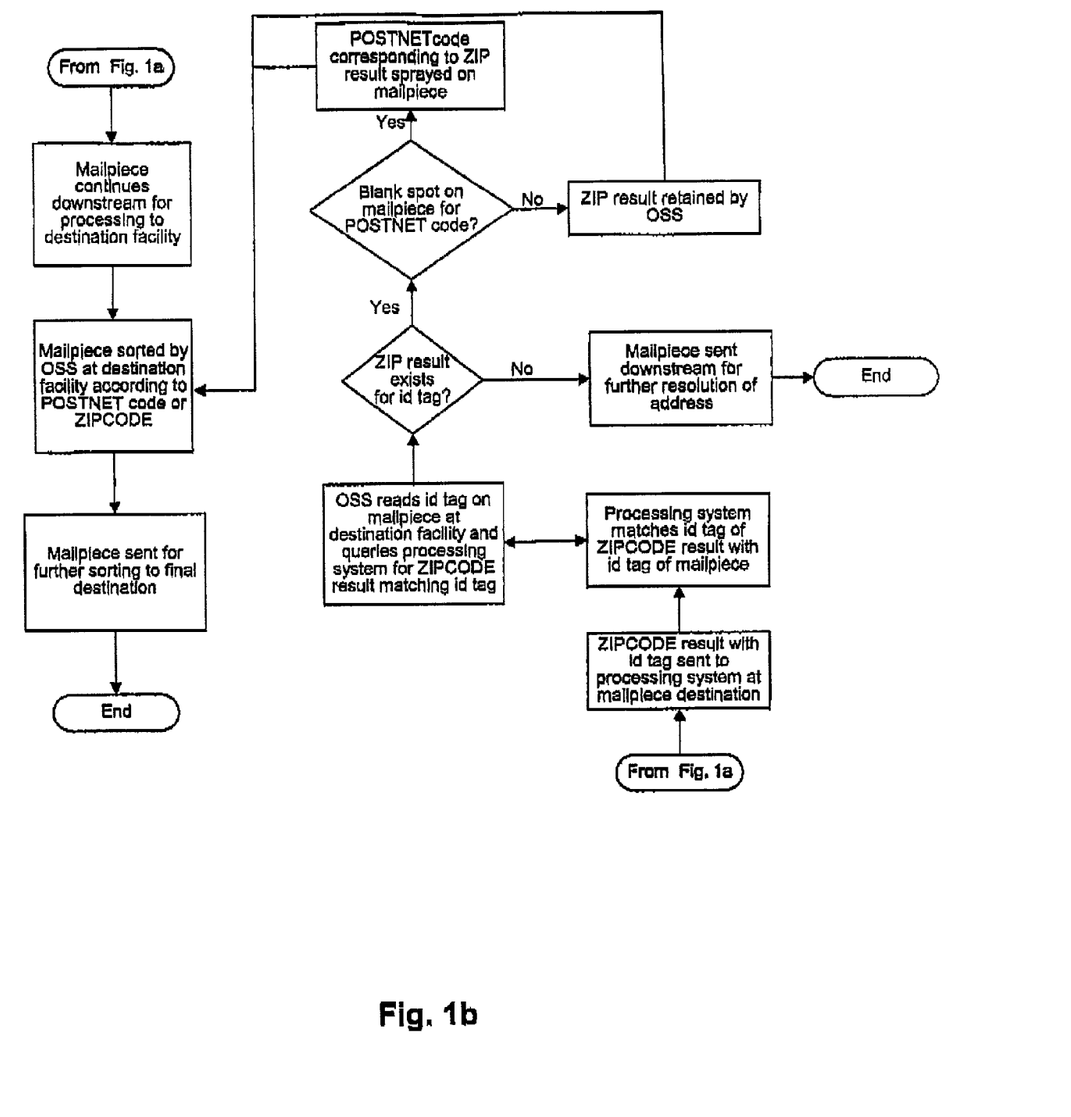
FIG. 1b is also a flowchart that shows other aspects in the encoding method.

FIGS. 1a and 1b are flow charts that illustrate an embodiment of an encoding method. This embodiment of the encoding method involves mail processing. FIG. 1a shows the flow at the origination USPS facility and FIG. 1b, which is a continuation of FIG. 1a, shows the flow at the destination USPS facility.

Mail is loaded onto the Multi-line Optical Character Reader ("MLOCR"), which applies an identification tag to the mailpiece, images the mailpiece, and sends the image to the Image Capture Unit ("ICU"). If the address can be read by the OCR with sufficient accuracy, the MLOCR applies a POSTNET code to the mailpiece, and the mailpiece continues downstream for sorting and processing to the destination facility. Once the mailpiece arrives at the destination facility, it is sorted by an Output Subsystem ("OSS") according to the POSTNET code or ZIPCODE on the mailpiece.

If the address cannot be read with sufficient accuracy by the OCR, the ICU stores the image and forwards the image to the Remote Computer Reader ("RCR") while the physical mailpiece is sent for further processing.

If the image is adequately processed by the RCR, the RCR determines the ZIPCODE corresponding to the imaged address and sends the ZIPCODE to a processing system to be matched with the mailpiece. If the image is not adequately processed by the RCR, the RCR forwards the image to the Dissociate Segmentation System ("DSS"), which dissociates the image into separate image segments or snippets.

DSS encrypts the mailpiece identification tag to the image snippets and attaches an attribute, such as "auto tag" or "top line" to the snippet to aid in the identification of the content of the snippet. The distributor's server sends individual tagged image segments to an Internet Service Provider ("ISP"), which in turn sends individual tagged image segments to users logged onto the ISP's network.

Users identify or read individual image segments and enter input information. Individual tagged image segments and corresponding input information are then sent by the user back to the ISP. The ISP sends the individual tagged image segments, corresponding input information, and the user's identity to the Distributor's server.

The Distributor's server recombines the input information corresponding to the image segments based on the identification tags for each snippet. A Directory Lookup Unit ("DLU") is then queried with the combined address to yield a ZIPCODE result.

The ZIPCODE result with the identification tag is sent to a processing system at the mailpiece destination. The processing system matches the identification tag of the ZIPCODE result with the identification tag of the mailpiece.

In the meantime, the distributor sends the user's identity and number of input segments per user to a computer, which calculates the amount of money owed to each user on predetermined schedule. The computer then prints check for each user on predetermined schedule, and the check is sent to the user.

Once the mailpieces arrive at the destination facility, those with resolvable ZIPCODES or POSTNET codes are sorted by an Output Subsystem ("OSS") according to the POST- NET code or ZIPCODE, as described above. Those mailpieces that are awaiting a ZIPCODE result because the OCR and RCR could not resolve the address also are processed by the OSS.

The OSS reads the identification tag on the unresolved mailpiece at the destination facility and queries the processing system for the ZIPCODE result matching the identification tag. If no ZIP result exists for the identification tag, the mailpiece continues downstream for further resolution of the address. If a ZIP result exists for the identification tag, a ZIP code corresponding to the ZIP result is applied if there is a blank spot on the mailpiece. If there is no space free from advertisements, extraneous marks, watermarks, etc, available to apply a POSTNET code, a POSTNET code is not applied, but the OSS retains the ZIP result for the mailpiece. The mailpiece is then sorted by the OSS according to the applied POSTNET code or retained ZIPCODE, and sent for further sorting to its final destination.

Figure 2A:
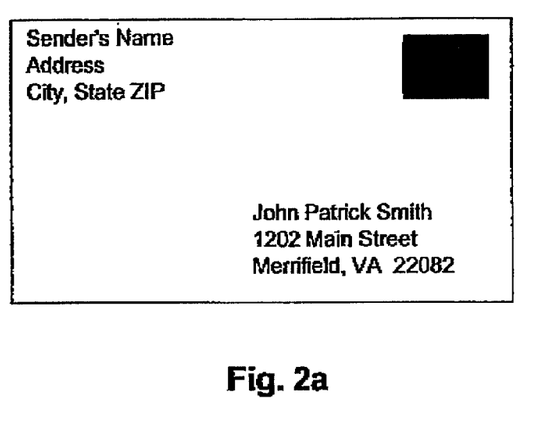
FIG. 2a is a graphical illustration of an addressed letter.
Figure 2B:
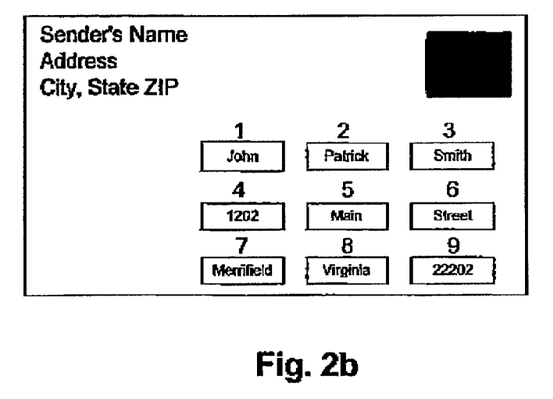
FIG. 2b is a graphical illustration of an addressed letter showing how the method of the present invention has coded segments of information on the addressed letter.

FIGS. 2a and 2b illustrate an embodiment of a dissociative segmentation stage of the encoding method. An address on a mailpiece (FIG. 2a) is imaged and the parts of the address on the image are dissociated or parsed into a multitude of snippets (FIG. 2b). FIG. 2b further illustrates how address information may be separated into multiple snippets, or fields of information. In one illustrative example, an address is dissociated into nine fields. Fields 1 through 3 correspond to a first, middle, and last name. Fields 4 through 6 correspond to a street address, street name, and street suffix. Fields 7 through 9 correspond to the city, state, and ZIP CODE information. A greater or lesser number of fields may be used. The system, for example, may allow for additional name information, such as titles. Additional fields may also designate post office box information.

Figure 3:
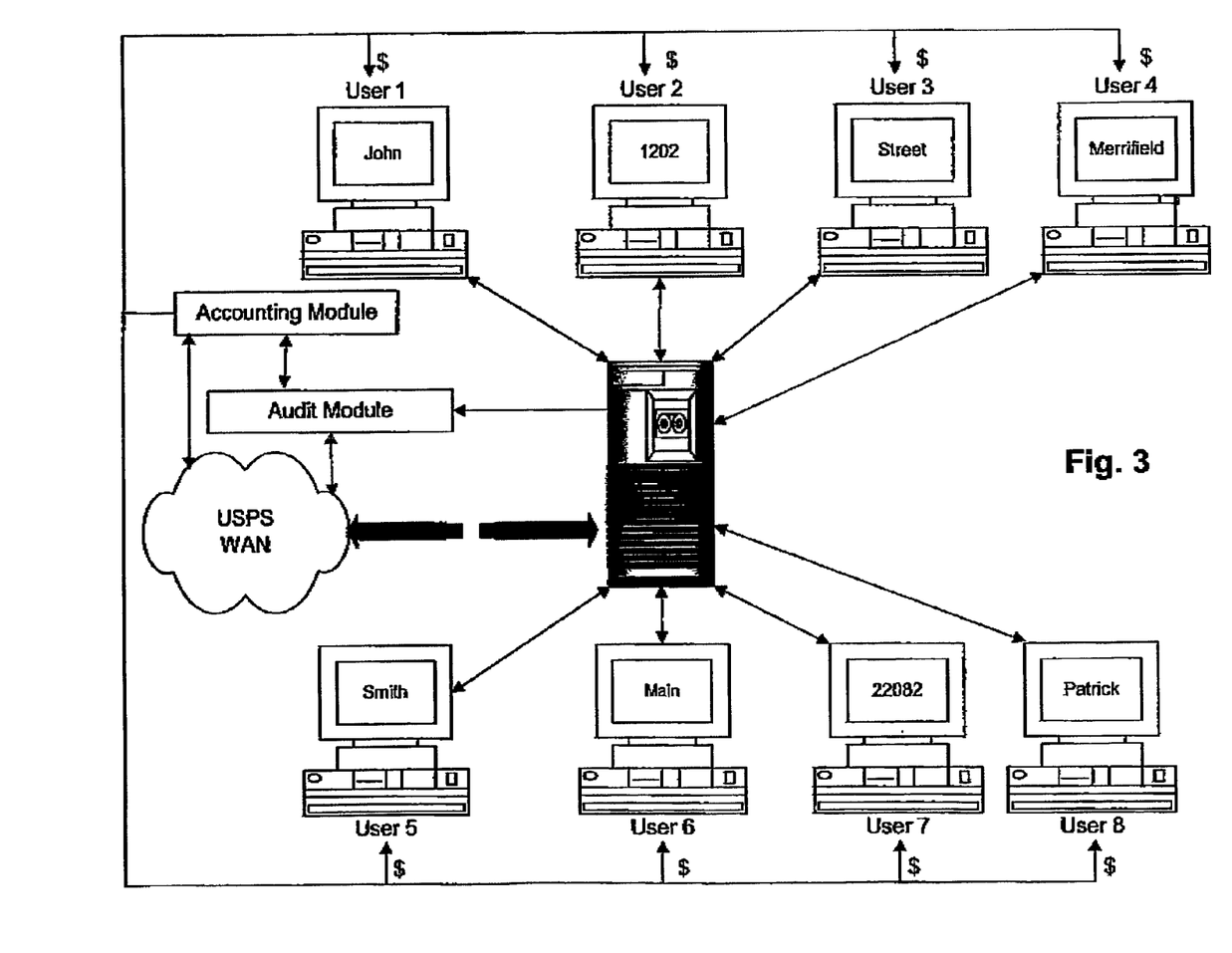
FIG. 3 is a graphical illustration showing how the present invention distributes encoded information.

FIG. 3 illustrates an embodiment of a distribution stage of the encoding method. After a mail identification tag is encrypted to each of the dissociated image snippets, the dissociated snippets are sent to an Internet Service Provider ("ISP"), which distributes the snippets to a multitude of users or subscribers who view the image on a display, such as a computer monitor. The users are paid for each item they key in. The USPS accounts for and pays the users with an accounting system. An audit module, which is connected to the USPS server and the accounting module, serves as quality control and discourages users from keying in erroneous information. The audit module randomly checks information entered by the subscribers, deducts payment for erroneous entries, and helps in ensuring that a user or subscriber does not sit at a terminal and key in random keystrokes. If additional quality control is desired, a single image snippet is sent to more than one user, and the information keyed in by the users is compared at the origination facility to ensure that similar results are obtained.

Figure 4A:
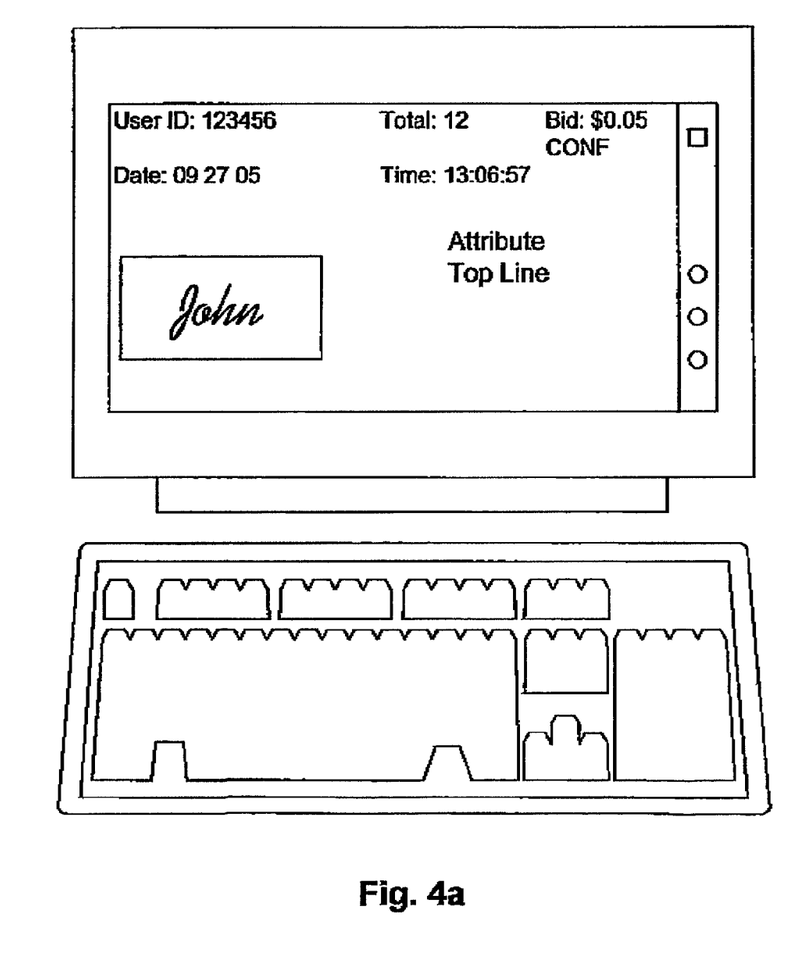
FIG. 4a is a graphical illustration of encoded information that a user may view on the user's display.
Figure 4B:
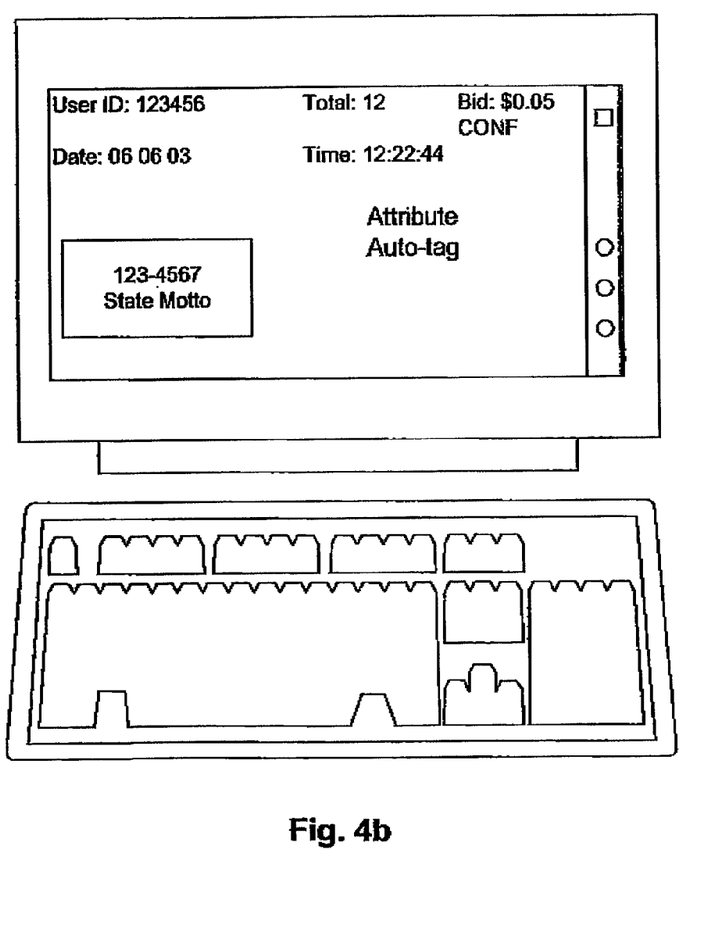
FIG. 4b is also a graphical illustration of encoded information that a user may view on the user's display.

FIGS. 4a and 4b are indicative of what a user might view on his or her display. FIG. 4a shows information potentially viewed for a mail processing application. The information in FIG. 4a includes: the user's identification number (123456), so that the user can be identified and paid for keying information; the total number of items (12) keyed; the user's confirmed bid per item ($0.05 CONF); the date and time; the image (John) in need of resolution; and the attribute (Top Line) to give the user an indication of the context of the information to be keyed.

FIG. 4b shows information potentially viewed for an auto tag application. The information in FIG. 4b includes the user's identification number (123456), so that the user can be identified and paid for keying information; the total number of items (12) keyed; the user's confirmed bid per item ($0.05 CONF); the date and time, the image (123-4567) in need of resolution; and the attribute (Auto-Tag) to give the user an indication of the context of the information to be keyed.

In one embodiment, the user bids for the price paid for each item keyed, and the USPS confirms the bid. In another embodiment, the USPS sets a fixed price per item keyed.

Figure 5:
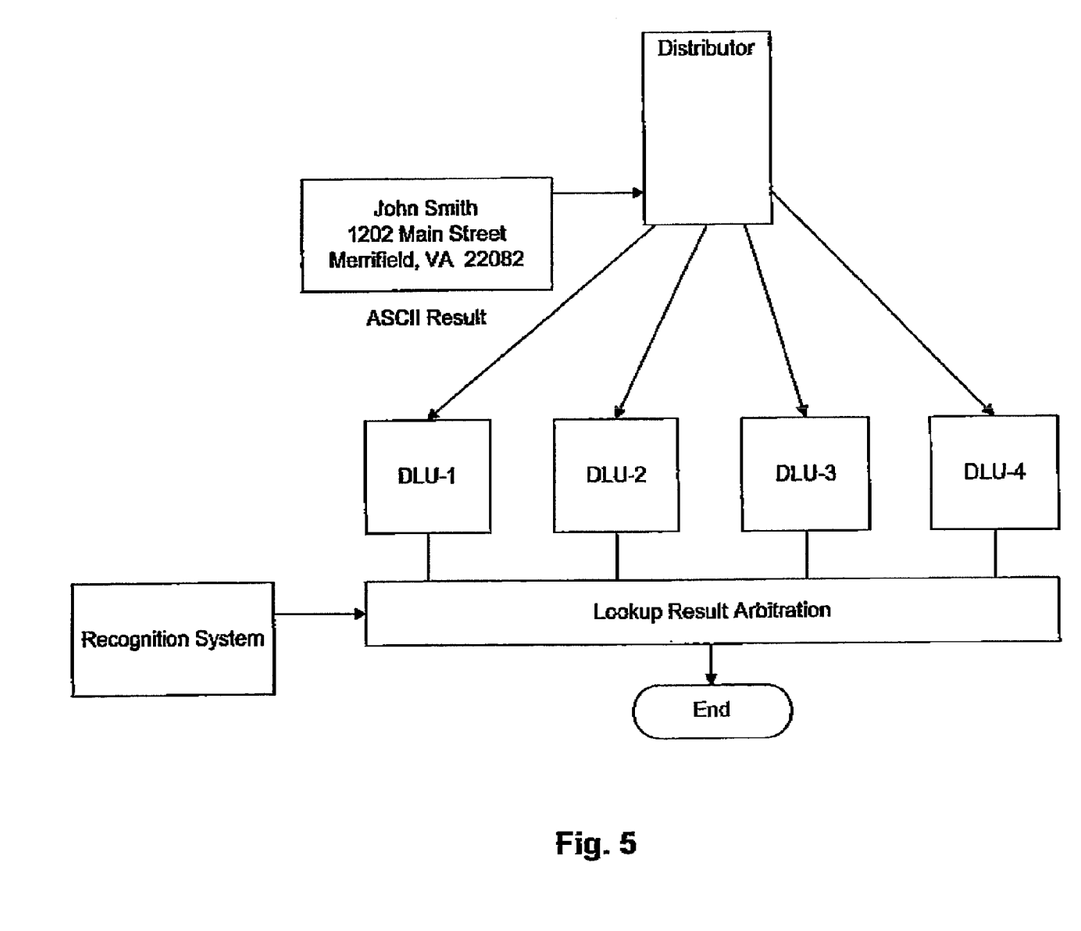
FIG. 5 is a schematic illustrating the return stage of the encoding method.

FIG. 5 illustrates the return stage of the encoding method. The information keyed in by the users is returned through the ISP to the distributor's server. The information is then assembled using the identification tag encrypted to the image snippets. The assembled information, such as an address, is sent to directory lookup units (DLUs), which query databases based on different protocols. The lookup result, for example, a ZIPCODE result for a particular address, is determined based on the assembled information. In one embodiment, lookup arbitration occurs, whereby the results of various DLUs are compared. If the results match from various DLUs, it is presumed that the result, such as the ZIPCODE result, is correct. As recognition system technology develops, a Recognition System could be used in the arbitration step to confirm and/or augment the results provided by the users.

Based on the result, a predetermined action is taken. For example, in the mail processing application, a POSTNET code is determined and sprayed on the front of the mailpiece based on the ZIPCODE result, and the mail is sorted on a barcode sorter and sent to its final destination. In the auto tag application, based on the result (perhaps the identity and address of the owner of the car registered to that particular auto tag), a traffic citation would be sent to the vehicle's owner. The result in the Congressional application could be used to sort each member's huge mail volumes uniquely based on a "plus four" ZIP associated with the member's name, thereby minimizing significant labor costs associated with manually sorting each member's mail. In the State Department application, the result, such as the secret destination code, could be securely encoded by subscribers and provided to the State Department. The State Department would then use the result, query its own DLUs, and associate the secret code, and thus the mailpiece, with the destination of the appropriate consulate or embassy.

The present invention is not intended to be limited by the kind of software or hardware that may be used in the encoding method. For example, the software that divides address image information into snippets is known to those skilled in the art. Such known technologies are intended to be used in the present invention. Likewise, software technology that attaches a code to each individual snippet of information is also known to persons of ordinary skill. Furthermore, the hardware and software that transmits snippet information to individual users is also known in the art. An example of such technology is the Internet connection between personal computers. The network connection may be through any of the networks currently known.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims which follow, the scope of which shall include all equivalents of the subject matter of the claims.

What is claimed is:

1. A method comprising:
   dissociating an image obtained from an envelope or package into a plurality of components, each component associated with an identifier (ID);
   transmitting each of said component and its corresponding ID to a respective plurality of interpreters, wherein each said interpreter receives no more than one said component of any said image; and
   receiving each ID and an ASCII representation of its respective component from each said interpreter; and
   deriving an image from at least the ASCII representations assembled according to the respective ID thereof, wherein the derived image corresponds to a delivery address suitable for the delivery of said envelope or package to the delivery address.

2. The method of claim 1 wherein for each of said components transmitted to said respective interpreter, said respective interpreter is remunerated in an amount determined by an accepted bid for providing interpretation services.

3. The method of claim 1 wherein for each of said components transmitted to said respective interpreter, said respective interpreter is remunerated in an amount determined by a fixed fee offered to said interpreter.

4. A method comprising:
   dissociating an image into a plurality of components, each component associated with an identifier (ID), wherein:
      the image depicts at least one visual aspect of a vehicle; and
      the image comprises visual information that corresponds to a registrant to whom registration of the vehicle is attributed in a vehicle registry;
   transmitting each of said component and its corresponding ID to a respective plurality of interpreters, wherein each interpreter receives no more than one said component of any said image;
   receiving the ID and an ASCII representation of its component from each said interpreter; and
   deriving a license plate identification from at least the ASCII representations assembled according to the respective ID thereof.

5. The method of claim 4 wherein for each of said components transmitted to said interpreter, said interpreter is requested to place a bid for providing interpretation services.

6. The method of claim 4 wherein for each of said components transmitted to said interpreter, said respective interpreter is remunerated in an amount selected from the group consisting of an accepted bid for providing interpretation services and a fixed fee offered to said interpreter.

* * * * *